UNITED STATES PATENT OFFICE.

WALTER S. LANDIS, OF NIAGARA FALLS, ONTARIO, CANADA, ASSIGNOR TO AMERICAN CYANAMID COMPANY, OF NASHVILLE, TENNESSEE, A CORPORATION OF MAINE.

PROCESS OF RENDERING SOLUBLE INSOLUBLE PHOSPHATES.

1,103,059.  Specification of Letters Patent.  Patented July 14, 1914.

No Drawing.   Application filed July 12, 1913.  Serial No. 778,729.

*To all whom it may concern:*

Be it known that I, WALTER S. LANDIS, a citizen of the United States, residing at Niagara Falls, in the Province of Ontario and Dominion of Canada, have invented certain new and useful Improvements in Processes of Rendering Soluble Insoluble Phosphates; and I do hereby declare the following to be a full, clear, and exact description of the invention, such as will enable others skilled in the art to which it appertains to make and use the same.

This invention relates to a process of rendering soluble the insoluble phosphates contained in phosphate ores, and has for its object to produce a method which will be more efficient, as well as more expeditious, than the methods heretofore proposed.

To these ends the invention consists in the novel steps and combinations of steps more fully hereinafter disclosed and particularly pointed out in the claims.

In my copending application entitled Process of producing available phosphoric acid, filed July 12, 1913, Number 778,730, I have briefly stated the objections to the present modes of procedure, and have disclosed a method which overcomes said objections involving the use of a drier and a calcining furnace. According to the method of this application, however, I am enabled to secure the same results without necessitating the use of said drier or furnace, as will now appear.

According to this invention I reduce the phosphate rock, and the sodium sulfate, $Na_2SO_4$, or sodium carbonate $Na_2CO_3$ to a fine powder and treat it with water the same or substantially the same as in my application above. But instead of first drying and then calcining the mixture as in said application, I thoroughly mix finely divided carbon such as powdered coal or coke with the wet mass, or I may grind the mixture by a wet grinding process after the carbon has been added. The mixture containing carbon is next placed on a suitable perforated grate and ignited, while air is forced through under pressure to insure that the clinkering or burning of the mass will take place simultaneously with the drying. The operations of clinkering and burning follow so quickly after the drying of each particle that there is no time for crystals to form and therefore there is no segregation or separating out of the sodium salt. Should the latter action be permitted to occur, the efficiency of the conversion of the insoluble phosphates into the soluble form would be greatly lessened as stated in my application above. On the other hand, by performing the sintering, clinkering or burning operations while the sodium salts are still thoroughly distributed throughout the mass the efficiency of the above conversion remains high as was the case in my said copending application.

I find that a wet mixture of say four inches thick and heated up to say 1500° C. is quite satisfactory. The mass dries very rapidly indeed, puffs up and then sinters in a perfect manner, and an analysis of the product shows a most satisfactory high yield of soluble phosphates. Oil or gas may be conveniently used for igniting the mass.

Although this process resembles the well known sintering processes employed with other materials, yet this is really a chemical process in that a well known definite reaction is brought about by the treatment disclosed.

After the product is produced, as above, it is then preferably finely ground to develop its highest availability.

What I claim is:—

1. The process of producing available phosphoric acid which consists in providing a finely divided mixture of phosphate rock, a soluble salt of sodium, water and carbon, and burning the same before the sodium salt has had time to crystallize to a substantial degree, substantially as described.

2. The process of producing available phosphoric acid which consists in providing a finely divided mixture of phosphate rock, a soluble salt of sodium, water and carbon, and burning the same before said salt crystallizes to a substantial extent and while blowing air through the mixture.

3. The process of producing available phosphoric acid which consists in providing a finely divided mixture of phosphate rock, a soluble salt of sodium, water and carbon; burning the same before the said salt has time to crystallize to a substantial extent; and finely dividing the resulting product, substantially as described.

4. The process of producing available phosphoric acid which consists in providing a finely divided mixture of phosphate rock, a soluble salt of sodium, water and carbon; burning the same before the said salt has time to crystallize; blowing air through the mass during the burning operation, and finely dividing the resulting product, substantially as described.

5. The herein described new composition of matter suitable for igniting on a perforated grate consisting of a finely divided mixture of phosphate rock, a soluble salt of sodium and carbon and water, substantially as described.

In testimony whereof I affix my signature, in presence of two witnesses.

WALTER S. LANDIS.

Witnesses:
S. HANNA,
J. L. DOLAN.